(12) United States Patent
Naruse et al.

(10) Patent No.: US 8,250,917 B2
(45) Date of Patent: Aug. 28, 2012

(54) PHYSICAL QUANTITY SENSOR

(75) Inventors: Hideto Naruse, Okaya (JP); Takayuki Kikuchi, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 424 days.

(21) Appl. No.: 12/364,074

(22) Filed: Feb. 2, 2009

(65) Prior Publication Data

US 2009/0205421 A1    Aug. 20, 2009

(30) Foreign Application Priority Data

Feb. 6, 2008    (JP) ................... 2008-026000

(51) Int. Cl.
*G01C 19/56* (2006.01)
(52) U.S. Cl. .................................... 73/504.12
(58) Field of Classification Search ................ 73/504.12
See application file for complete search history.

(56) References Cited

U.S. PATENT DOCUMENTS

| | | | |
|---|---|---|---|
| 5,570,010 A * | 10/1996 | Jin et al. ................... | 324/67 |
| 6,257,061 B1 * | 7/2001 | Nonoyama et al. ........ | 73/514.32 |
| 7,276,776 B2 | 10/2007 | Okuda et al. | |
| 7,446,390 B2 | 11/2008 | Okuda et al. | |
| 7,575,427 B2 | 8/2009 | Sato | |
| 2006/0071695 A1 * | 4/2006 | Lee ............................. | 327/112 |
| 2009/0250788 A1 | 10/2009 | Okuda et al. | |

FOREIGN PATENT DOCUMENTS

| | | |
|---|---|---|
| JP | A-06-247946 | 7/1994 |
| JP | A-07-077538 | 3/1995 |
| JP | B-2935810 | 6/1999 |
| JP | A-2002-100732 | 4/2002 |
| JP | A-2002-213961 | 7/2002 |
| JP | A-2002-267448 | 9/2002 |
| JP | A-2003-194544 | 7/2003 |
| JP | A-2005-108874 | 4/2005 |
| JP | A-2005-197396 | 7/2005 |
| WO | WO 02/073131 A1 | 9/2002 |

* cited by examiner

*Primary Examiner* — Hezron E Williams
*Assistant Examiner* — Gregory J Redmann
(74) *Attorney, Agent, or Firm* — Oliff & Berridge, PLC

(57) ABSTRACT

A physical quantity sensor includes a vibration element having drive arm sections and a detection arm section, a driving circuit generating a driving signal for driving the drive arm sections with a first driving line and a second driving line, and a detection circuit detecting a detected signal from the detection arm section with a first detection line and a second detection line. At least one of the first driving line and the second driving line is wired so that a static coupling is generated with respect to the first detection line and the second detection line.

7 Claims, 5 Drawing Sheets

PHYSICAL QUANTITY SENSOR

TECHNICAL FIELD

The present invention relates to a physical quantity sensor outputting a signal corresponding to angular velocity or acceleration applied to apparatuses.

BACKGROUND TECHNOLOGY

As physical quantity sensors outputting a signal corresponding to angular velocity or acceleration applied to apparatuses, there are known angular velocity sensors detecting the angular velocity applied to the apparatuses, acceleration sensors detecting acceleration of dropping velocity or the like, gyro sensors measuring angular velocity (rate gyros) and an angle (posture gyros), and the like. In a case where those physical sensors are installed in a vehicle and the like, and utilized as a crash sensor, it is fatal that a crash cannot be detected due to failures in the sensor.

In order to solve this problem, for example, Patent Document 1 shows a method in which, in a rotational velocity sensor having a detection arm vibrated in accordance with rotation, a testing electrode is fixed to the detection arm so as to be electrostatically coupled with the arm, and the detection arm is vibrated as a test by a testing signal supplied from the testing electrode before starting.

[Patent Document 1] Japanese Patent No. 2935810.

The conventional method, however, sacrifices the sensitivity of the rotational velocity sensor due to the testing electrode attached to the detection arm, and further has a problem in that the increased number of electrical contacts due to the testing electrode added to electrodes normally used impairs the reliability.

SUMMARY

The invention intends to solve at least part of the above problem, and can be realized by the following aspects and application examples.

APPLICATION EXAMPLE 1

A physical quantity sensor is characterized in that the physical quantity sensor includes: a vibrating element having a drive arm section and a detection arm section; a driving circuit generating a driving signal for driving the drive arm section with a first driving line and a second driving line; and a detection circuit detecting a detected signal from the detection arm section with a first detection line and a second detection line, and at least one of the first driving line and the second driving line is wired so that a static coupling is generated with respect to the first detection line and the second detection line.

According to the structure, a driving signal is generated from the driving circuit when the physical quantity sensor is in a motionless state, and then the driving signal is transmitted to the first detection line and the second detection line by a static coupling, resulting in a pseudo detected signal being generated. As a result, it can be confirmed that whether the detection circuit operates normally or not.

APPLICATION EXAMPLE 2

The physical quantity sensor is characterized in that one of the first driving line and the second driving line is wired so that different static couplings are generated with respect to the first detection line and the second detection line.

According to the structure, a driving signal is generated from the driving ircuit when the physical quantity sensor is in a motionless state, and then the driving signal is transmitted to the first detection line and the second detection line by a static coupling, resulting in a pseudo detected signal being generated. As a result, it can be confirmed that whether the detection circuit operates normally or not.

APPLICATION EXAMPLE 3

The physical quantity sensor is characterized in that a first inverter and a second inverter are coupled in series with one of the first driving line and the second driving line; and a wiring line coupling the driving circuit and the first inverter, and another wiring line coupling the first inverter and the second inverter are wired so that static couplings are generated with respect to the first detection line and the second detection line.

According to the structure, a driving signal is generated from the driving circuit when the physical quantity sensor is in a motionless state, and then the driving signal is transmitted to the first detection line and the second detection line by a static coupling, resulting in a pseudo detected signal being generated. As a result, it can be confirmed that whether the detection circuit operates normally or not.

APPLICATION EXAMPLE 4

The physical quantity sensor is characterized in that a wiring path of at least one of the first driving line and the second driving line is switched so that the static coupling is not generated in a normal operation state.

According to the structure, since the static coupling is not generated in a normal operation state, the detection sensitivity of the physical quantity sensor can be improved.

DESCRIPTION OF EXEMPLARY EMBODIMENTS

Embodiments of a physical quantity sensor are described below with reference to accompanying drawings.

First Embodiment

<Structure of a Gyro Sensor>

Figure 1A:
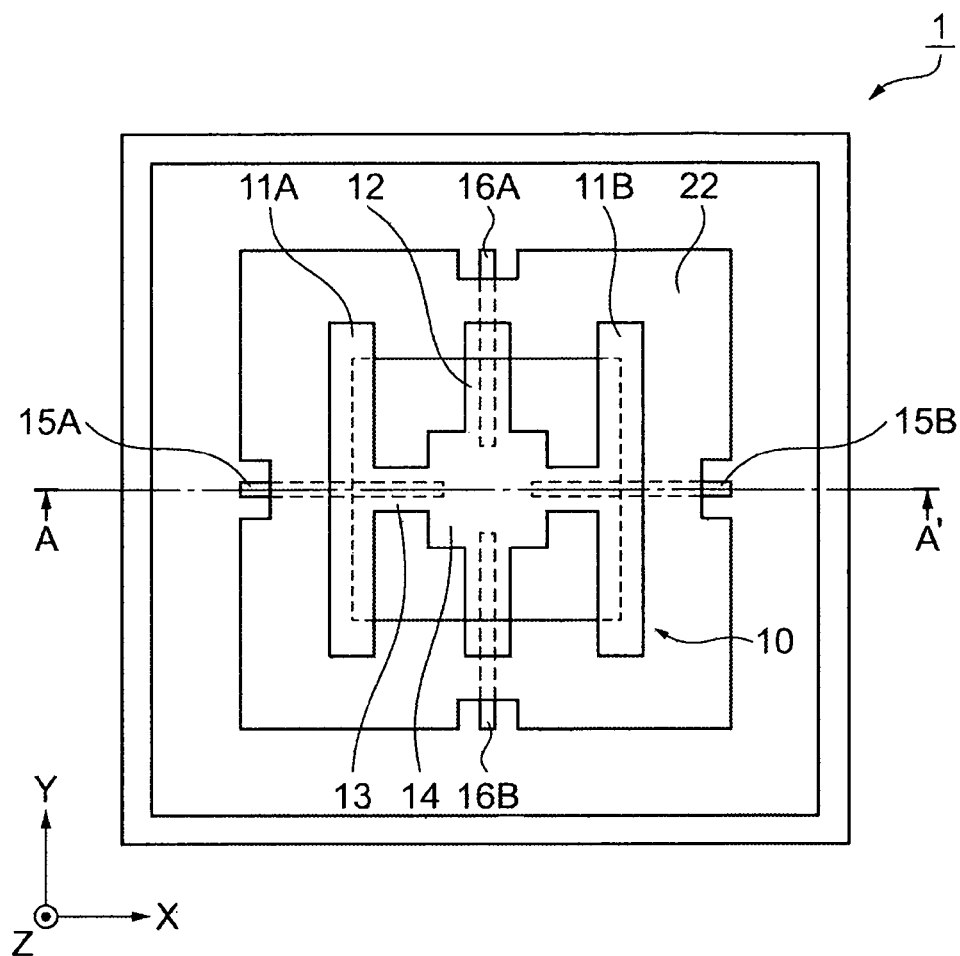
FIG. 1. illustrates a plan view and a sectional view showing a structure of A gyro sensor.
Figure 1B:
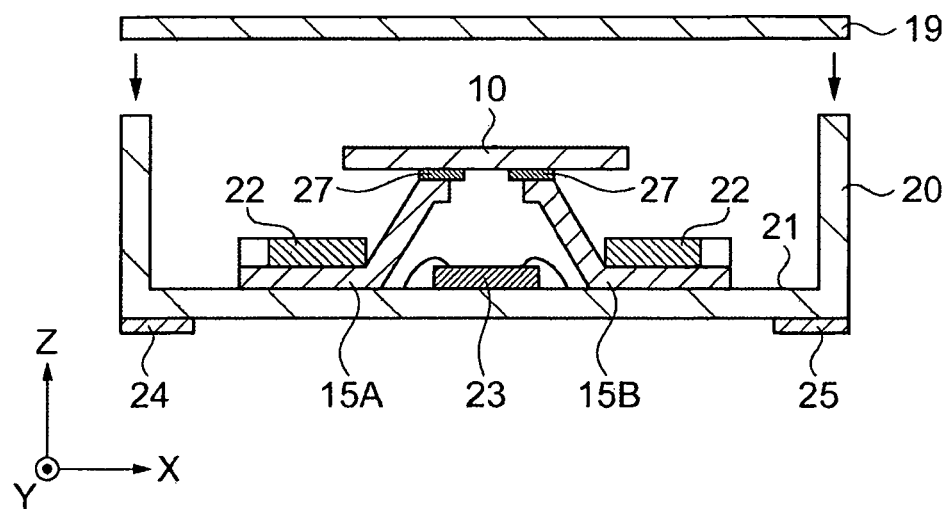

First, a structure of a gyro sensor that is a physical quantity sensor according to a first embodiment of the invention is described with reference to FIG. 1. FIG. 1(A) is a plan view showing the structure of the gyro sensor according to the first embodiment. FIG. 1(B) is a sectional view taken along a line A-A' of FIG. 1(A).

As shown in FIGS. 1(A) and 1(B), a gyro sensor 1 includes a gyro element 10 that is a vibrating element formed by a piezoelectric material such as quartz. The vibrating element 10 has drive arm sections 11A and 11B that are shaped in a bar and extend in a Y axis direction, and a detection arm section 12. The drive arm sections 11A and 11B face each other so as to sandwich the detection arm section 12, and are connected to the detection arm section 12 at a nearly center part of each arm with an arm supporting section 13 extending in an X axis direction. In addition, a supporting section 14 for supporting the gyro element 10 is formed at a central part of the detection arm section 12.

The gyro element 10 has electrodes (not shown) formed thereon, and is adapted to be operable in known drive and detection modes. In the drive mode, the drive arm sections 11A and 11B are flexurally vibrated in the X axis direction in an opposite phase with each other.

If a rotation occurs around a Z axis serving as a rotational axis while the drive arm sections 11A and 11B are vibrated, a Coriolis force is generated in the drive arm sections 11A and 11B. The Coriolis force is transferred to the detection arm section 12 through the arm supporting section 13. The detection arm section 12 responds to the Coriolis force to vibrate in the X axis direction in accordance with a magnitude of the Coriolis force. Then, strain generated by the vibration of the detection arm section 12 is detected as an electrical signal, enabling the size, direction and the like of angular velocity to be recognized.

A connection electrode 27 is provided on one surface of the gyro element 10. The connection electrode 27 and lead pieces 15A, 15B, 16A, and 16B are connected with a conductive adhesive. The lead pieces 15A, 15B, 16A, and 16B are strip-shaped conductive members and are bended in the Z axis direction to elevate and support the gyro element 10.

The lead pieces 15A, 15B, 16A, and 16B are also fixed to a supporting substrate 22, and thermally compression bonded to a package bottom 21 with Au bumps. Electrical wiring lines (not shown) are formed on the package bottom 21 so that electrical conduction is from the gyro element 10 to the package bottom 21 through the lead pieces 15A, 15B, 16A and 16B. Here, the supporting substrate 22 is a substrate provided with an insulation layer such as a polyimide resin on a surface of a conductive material such as cupper and adapted to prevent a short between the lead pieces.

A circuit element 23 is provided on the package bottom 21 located below the gyro element 10, and connected by wire bonding to the electrical wiring lines formed on the package bottom 21.

Output terminals 24 and 25 are provided on the outer bottom of a ceramic package 20, and electrically connected to the electrical wiring lines formed on the package bottom 21. As described above, an angular velocity signal can be outputted externally from the output terminal 24 and 25. In this regard, the output terminal 24 and 25 can be provided at any location of the ceramic package 20.

Then, the inside of the ceramic package 20 is kept in a vacuum atmosphere, followed by being sealed with a lid 19. As a result, the gyro sensor 1 is structured. Here, the gyro element may be made by not only a piezoelectric material such as quartz but a constant modulus material such as an elinvar material.

<Circuit Structure of the Gyro Sensor>

Figure 2A:
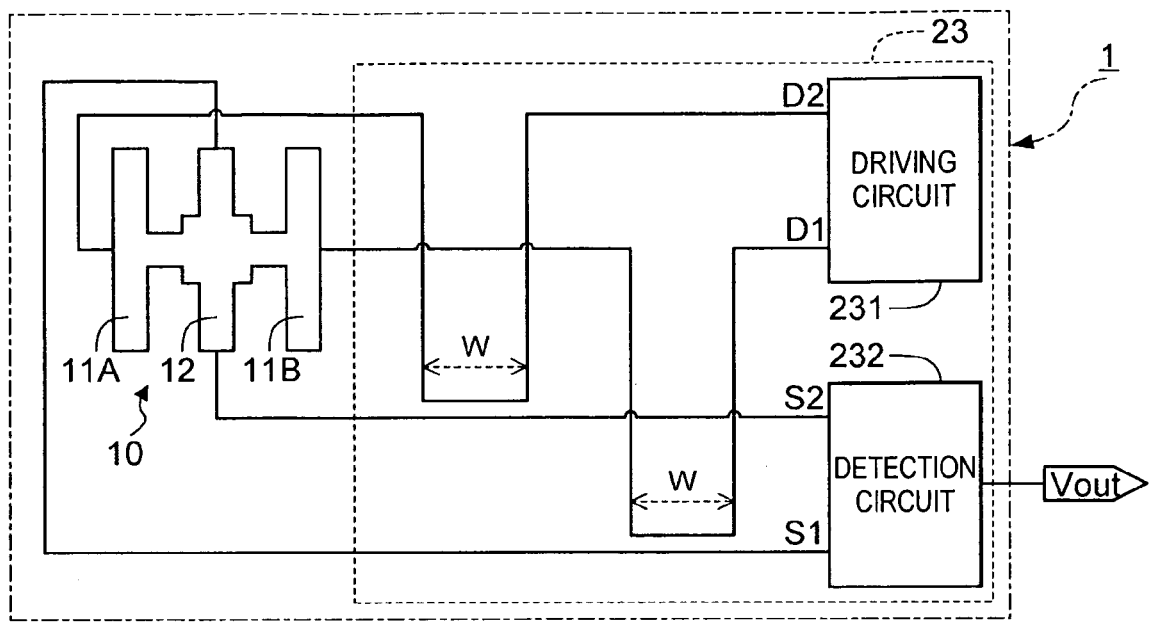
FIG. 2. illusstrates a circuit diagram showing a structure of a gyro sensor according to a first embodiment ,and a timing chart.
Figure 2B:
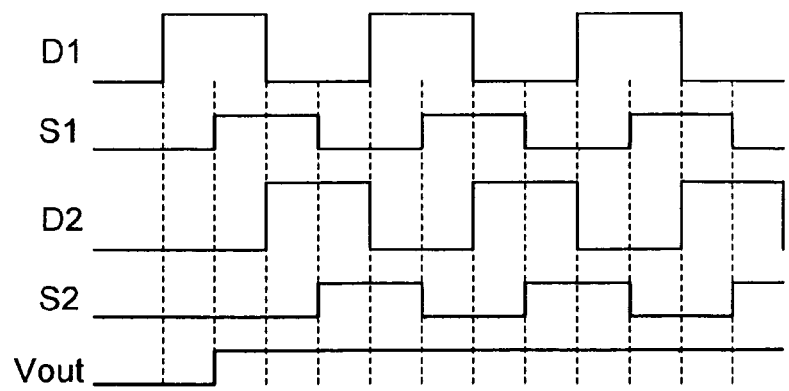

Next, a circuit structure of the gyro sensor is described with reference to FIG. 2. FIG. 2(A) is a circuit diagram showing a circuit structure of the gyro sensor. FIG. 2(B) is a timing chart showing an operation of the gyro sensor.

As shown in FIG. 2(A), the circuit element 23 shown in FIG. 1 is adapted by including a driving circuit 231 generating a driving signal for driving the drive arm sections 11A and 11B, and a detection circuit 232 that converts a detected signal outputted from the detection arm section 12 into an angular velocity signal Vout and outputs it from the output terminal 24.

The electrodes formed on the drive arm sections 11A and 11B of the gyro element 10 are connected to the driving circuit 231 with a first driving line D1 and a second driving line D2. The driving signal amplified and phase adjusted by the driving circuit 231 is applied to the electrodes formed on the drive arm sections 11A and 11B, resulting in the drive arm sections 11A and 11B performing a flexural vibration.

On the other hand, the electrodes formed on the detection arm section 12 of the gyro element 10 are connected to the detection circuit 232 with a first detection line S1 and a second detection line S2. The detection circuit 232 includes a differential amplifier circuit, a synchronous detection circuit, a smoothing circuit, a processing circuit, and the like, which are not shown. The differential amplifier circuit differentially amplifies a detected signal detected through the first detection line S1 and the second detection line S2. The synchronous detection circuit detects an output signal of the differential amplifier circuit in synchronized with a signal of the driving circuit 231. An output signal of the synchronous detection circuit is smoothed by the smoothing circuit, and then converted into the angular velocity signal Vout by the processing circuit.

As shown in FIG. 2(A), the first driving line D1 is wired so as to take a circuitous route in the vicinity of the first detection line S1 with a distance of a width W for generating a static coupling. The second driving line D2 is also wired so as to take a circuitous route in the vicinity of the second detection line S2 with a distance of the width W for generating a static coupling.

FIG. 2(B) is a timing chart showing an operation to confirm whether the detection circuit 232 operates normally or not when the gyro sensor 1 is in a motionless state. As shown in FIG. 2(B), the driving circuit 231 outputs a driving signal wave form for driving the drive arm sections 11A and 11B of the gyro element 10 through the first driving line D1. The driving signal wave form in the first driving line D1 is transmitted to the first detection line S1 due a static coupling of the width W between the first driving line D1 and the first detection line S1. In the second driving line D2, a wave form having a reversed phase of that in the first detection driving line D1 is generated in relation to the driving signal wave form of the first driving line D1. The wave form in the second driving line D2 is transmitted to the second detection line S2 due a static coupling of the width W between the second driving line D2 and the second detection line S2.

The wave form of the first detection line S1 and the wave form of the second detection line S2 are inputted to the detection circuit 232 as a pseudo detected signal so that the angular velocity signal Vout is outputted from the output terminal 24. If the detection circuit 232 does not operate normally, the angular velocity signal Vout does not reach a desired voltage. As a result, the failure can be confirmed.

According to the embodiment mentioned above, the following advantageous effects can be obtained.

In the embodiment, if a driving signal is outputted from the driving circuit 231 when the gyro sensor 1 is in a motionless state, a driving signal wave form is transmitted to the first detection line S1 and the second detection line S2 by a static coupling, resulting in a pseudo detected signal being generated. Because of this, it can be confirmed that whether the detection circuit 232 operates normally or not.

Thus the embodiment of the gyro sensor has been described, but the invention is not by any means limited to the above embodiment, and it can be applied to various embodiments without departing from the spirit and scope of the invention. Hereinafter, modification examples are described.

MODIFICATION EXAMPLE 1

Figure 3A:
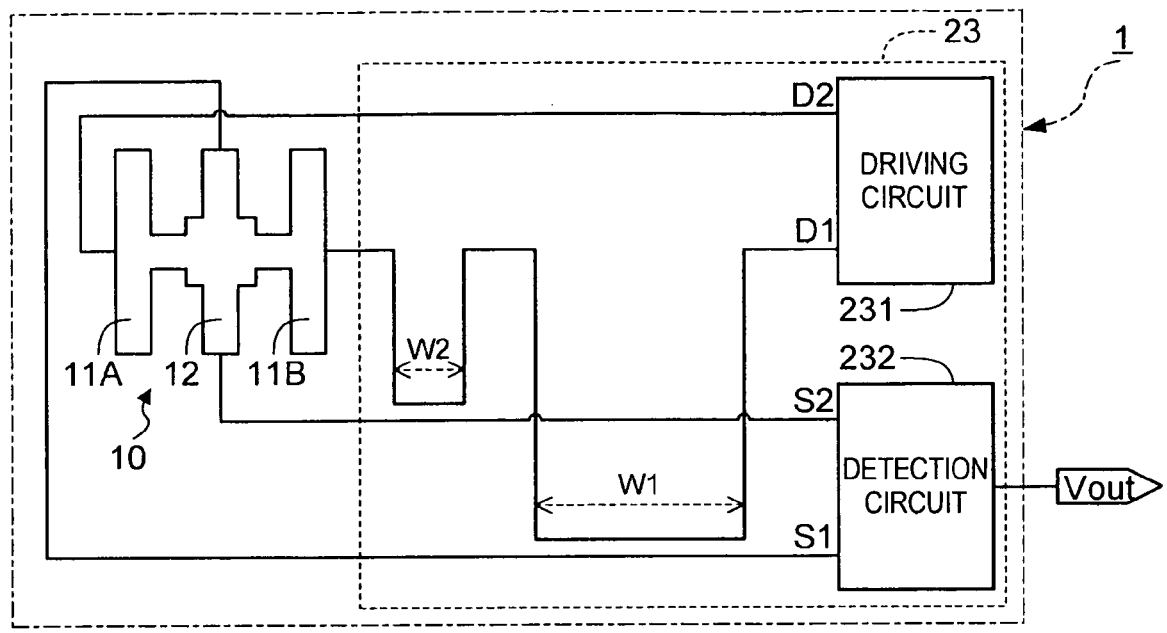
FIG. 3. illustrates a circuit diagram showing a structure of a gyro sensor according to a modification example 1, and a timing chart.
Figure 3B:
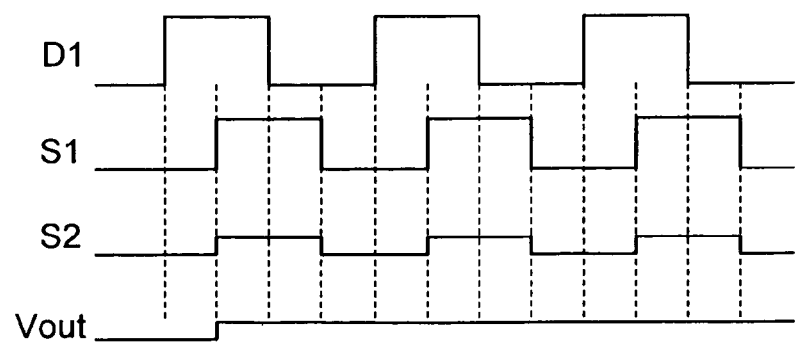

A modification example 1 of the gyro sensor is described. In the first embodiment, the method for confirming the operation of the detection circuit 232, when the gyro sensor 1 is in a motionless state, has been described by utilizing the static coupling of the width W between the first driving line D1 and the first detection line S1 as well as the static coupling of the width W between the second driving line D2 and the second detection line S2. Alternatively, as shown in FIG. 3(A), the static coupling of a width W1 between the first driving line D1 and the first detection line S1 as well as the static coupling of a width W2 between the second driving line D2 and the second detection line S2 may be utilized where the widths are set as W1≠W2. As shown in FIG. 3(B), the amplitudes can be differentiated by differences in the static couplings even though the signal timings generated between the first detection line S1 and the second detection line S2 are the same since the static couplings are generated based on the different widths, i.e., W1≠W2. The amplitude difference of the first detection line S1 and the second detection line S2 is inputted to the detection circuit 232, resulting in the angular velocity signal Vout being outputted from the output terminal 24. If the detection circuit 232 does not operate normally, the angular velocity signal Vout does not reach a desired voltage. As a result, the failure can be confirmed.

MODIFICATION EXAMPLE 2

Figure 4A:
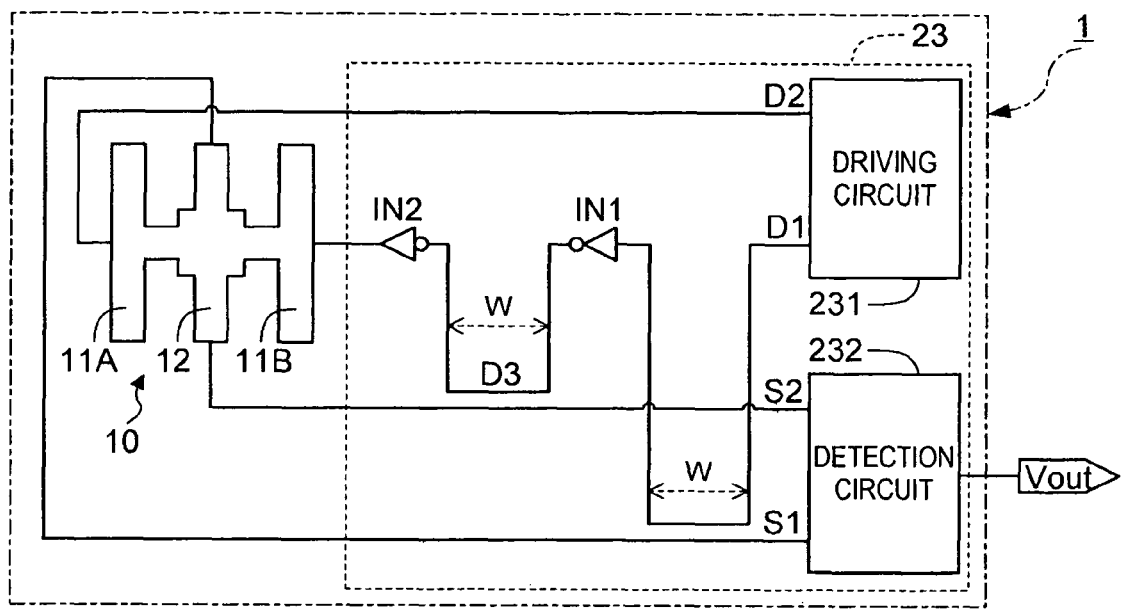
FIG. 4. illustrates a circuit diagram showing a structure of a gyro sensor according to a modification example 2, and a timing chart.
Figure 4B:
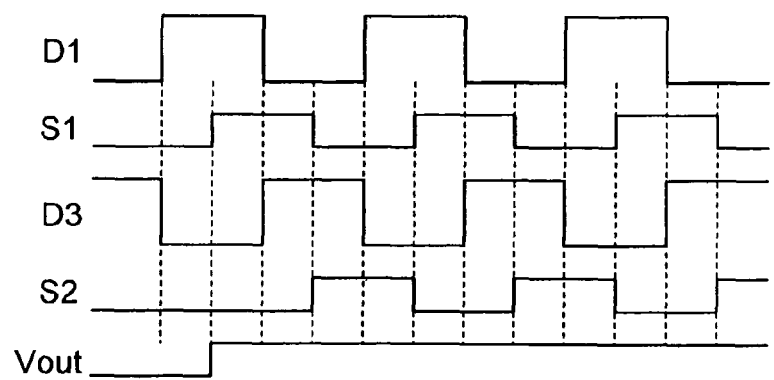

A modification example 2 of the gyro sensor is described. In the modification example 1, the method has been described in which the static coupling of the width W1 between the first driving line D1 and the first detection line S1 as well as the static coupling of the width W2 between the first driving line D1 and the second detection line S2 are utilized, where the widths are set as W1≠W2. Alternatively, as shown in FIG. 4(A), 2 inverters IN1 and IN2 are inserted in the first driving line D1 with a wiring line D3 between the inverters IN1 and IN2. The static coupling of the width W between the first driving line D1 and the first detection line S1 as well as the static coupling of the width W between the wiring line D3 and the second detection line S2 may be utilized. As shown in FIG. 4(B), the amplitude difference of the first detection line S1 and the second detection line S2 is inputted to the detection circuit 232, resulting in the angular velocity signal Vout being outputted from the output terminal 24. If the detection circuit 232 does not operate normally, the angular velocity signal Vout does not reach a desired voltage. As a result, the failure can be confirmed.

MODIFICATION EXAMPLE 3

A modification example 3 of the gyro sensor is described. In the modification example 2, the method has been described in which 2 inverters IN1 and IN2 are inserted in the first driving line D1, and the static coupling of the width W between the first driving line D1 and the first detection line S1 as well as the static coupling of the width W between the wiring line D3 and the second detection line S2 are utilized.

Figure 5:
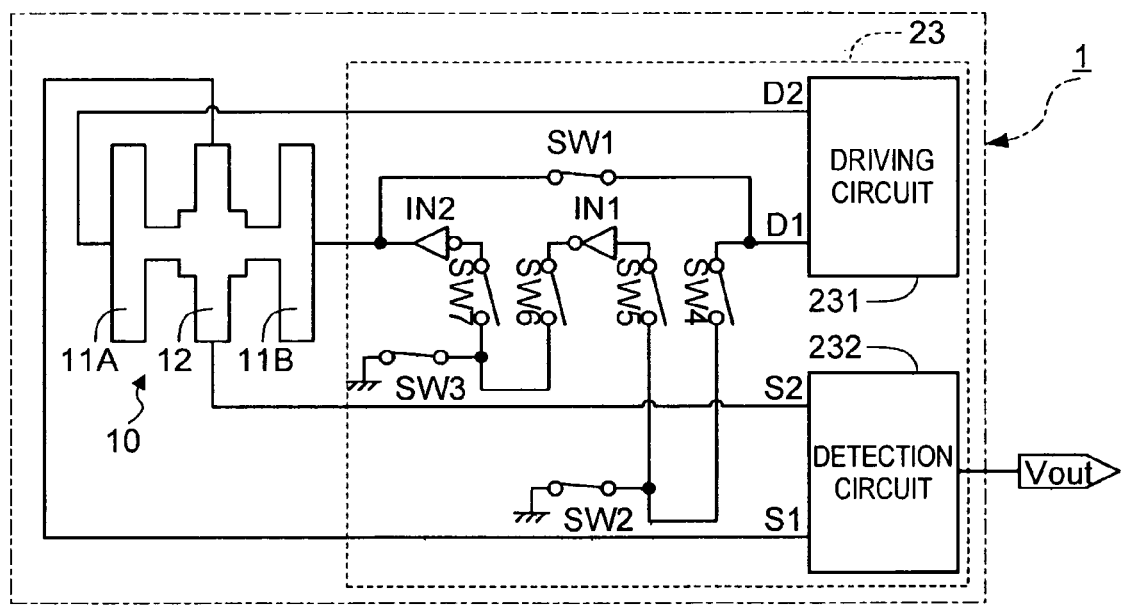
FIG. 5. illustrates a circuit diagram showing a structure of a gyro sensor according to a modification example 2, and a timing chart.

However, the inverters IN 1 and IN2 are not necessary in a normal operation state. In order to avoid the problem, as shown in FIG. 5, switching elements SW1 to SW7 are inserted. In a normal operation state, the switching elements SW1 to SW3 are connected while the switching elements SW4 to SW7 are not connected. In a case where the operation of the detection circuit 232 is confirmed in a starting-up state, the switching elements SW1 to SW3 are not connected while the switching elements SW4 to SW7 are connected. The entire disclosure of Japanese Patent Application No. 2008-026000, filed on Feb. 6, 2008 is expressly incorporated by reference herein.

[Reference Numerals]

1: gyro sensor 10: gyro element 11A, 11B: drive arm section 12: detection arm section 13: arm supporting section 14: supporting section 15A, 15B, 16A, 16B: lead piece 19: lid 20: ceramic package 21: package bottom 22: supporting substrate 23: circuit element 24, 25: output terminal 27: connection electrode 231: driving circuit 232: detection circuit

The invention claimed is:

1. A physical quantity sensor, comprising:
a vibrating element having a drive arm section and a detection arm section;
a driving circuit generating a driving signal for driving the drive arm section with a first driving line and a second driving line; and
a detection circuit detecting a detected signal from the detection arm section with a first detection line and a second detection line,
wherein at least one of the first driving line and the second driving line is wired so that a static coupling is generated between a portion of wiring of at least one of the first and second driving lines disposed adjacent to a portion of wiring of at least one of the first and second detection lines,
wherein the driving signal carried by the at least one of the first and the second driving lines is transmitted to the at least one of the first and second detection lines via the static coupling, and
wherein the detection circuit performs a testing operation of the physical quantity sensor based upon the driving signal transmitted to the at least one of the first and second detection lines via the static coupling.

2. The physical quantity sensor according to claim 1, wherein one of the first driving line and the second driving line is wired so that different static couplings are generated with respect to the first detection line and the second detection line.

3. The physical quantity sensor according to claim 1, wherein: a first inverter and a second inverter are coupled in series with one of the first driving line and the second driving line: and a wiring line coupling the driving circuit and the first inverter, and another wiring line coupling the first inverter and the second inverter are wired so that static couplings are generated with respect to the first detection line and the second detection line.

4. The physical quantity sensor according to claim 1, wherein a wiring path of at least one of the first driving line and the second driving line is switched so that the static coupling is not generated in a normal operation state.

5. The physical quantity sensor according to claim 2, wherein a wiring path of at least one of the first driving line and the second driving line is switched so that the static coupling is not generated in a normal operation state.

6. The physical quantity sensor according to claim 3, wherein a wiring path of at least one of the first driving line and the second driving line is switched so that the static coupling is not generated in a normal operation state.

7. The physical quantity sensor according to claim 1, wherein at least one of the first driving line and the second driving line is wired by an indirect route with respect to the first detection line and the second detection line so that the static coupling is generated between the portion of wiring of at least one of the first and second driving lines disposed adjacent to the portion of wiring of at least one of the first and second detection lines.

\* \* \* \* \*